United States Patent [19] [11] Patent Number: 6,009,471
Harumoto et al. [45] Date of Patent: Dec. 28, 1999

[54] SERVER SYSTEM AND METHODS FOR CONFORMING TO DIFFERENT PROTOCOLS

[75] Inventors: Hideaki Harumoto; Keiji Okamoto, both of Osaka-fu; Yasuhiro Yoshida; Takeshi Omura, both of Kyoto-fu, all of Japan

[73] Assignee: Matsushita Electric Industrial Co., Ltd., Osaka-fu, Japan

[21] Appl. No.: 09/066,576

[22] Filed: Apr. 27, 1998

[30] Foreign Application Priority Data

Apr. 19, 1997 [JP] Japan ................................. 9-111070

[51] Int. Cl.⁶ ........................................................ G06F 16/00
[52] U.S. Cl. ............................ 709/231; 709/236; 709/246
[58] Field of Search ................................... 709/231, 236, 709/246

[56] References Cited

FOREIGN PATENT DOCUMENTS 3-116259  5/1991  Japan .
7-28721   1/1995  Japan .

Primary Examiner—Zarni Maung
Assistant Examiner—Saleh Najjar
Attorney, Agent, or Firm—McDermott, Will & Emery

[57] ABSTRACT

A protocol-conforming server system separated into the receive part and the send part and provided with a receive protocol processor for processing the receive and a send protocol processor for processing the send which permits speedy sending out large-sized data which requires to be continuous and consecutive, e.g., moving image data and audio data. Packet header models are provided as template to save processing time, for the data covered by the present invention are sent out in the form of a packet, and almost the same packet header is used each time.

16 Claims, 11 Drawing Sheets

SERVER SYSTEM AND METHODS FOR CONFORMING TO DIFFERENT PROTOCOLS

BACKGROUND OF THE INVENTION

1. Field of the Invention

The present invention relates to a server system and methods for conforming to different protocols. More particularly, the server system and methods for adapting to various protocol formulas in case of sending out large quantities of continuous and consecutive data such as audio data of moving images and voices on a communication line.

2. Description of the Prior Art

It is necessary for sending and receiving-of data via such communication lines as the Ethernet to generate and analyze communication data conforming to different protocols. Furthermore, in transferring a large volume of data such as moving images at a high speed, it is important to speed up the protocol adapting process.

FIG. 12 shows the conventional protocol-conforming process in the server system.

In the prior art, a server system 608 is connected to a terminal unit 607 via a communication line switch 606. According to the instructions from a central control 605, a protocol sender-receiver 604 makes a processing to send or receive the communication data.

When the server sends out the data to the terminal unit in response to a demand for data from a terminal unit, at first, the central control 605 prepares header information for the communication such as data to communicate, and the addresses of the terminal units on the communication lines, and further, stores them in a header memory 602 and in a contents memory 603 respectively.

According to instructions from the central control 605, a protocol separator-coupler 601 reads out the header from the header memory 602 and the contents from the contents memory 603, and then couples the header and the contents, and thereafter generates a packet data adapted to the form of the communication protocol, which data is sent to the protocol sender-receiver 604. The central control 605 instructs the protocol sender-receiver 604 to send out the data, and the data are sent to the terminal unit 607.

The above mentioned header has different standards based on communication systems, e.g., TCP/IP for the Internet, IPX standard of Novell Inc., a data transfer system of NFS protocol, and data transfer system of "endless effluence" style, etc. The communication system comprises the signal to designate its communication style in response to the request-to-send of the terminal unit. After reading out the signal, the central control 605 prepares the header applicable to the demand from the terminal unit.

On the other hand, in case of receiving data from the terminal unit 607, a packet data is first received by the protocol sender-receiver 604 via network. The said protocol sender-receiver 604 transfers the received packet data to the protocol separator-coupler 601, where the data is separated into the header and the contents. The header obtained as mentioned above is stored in the header memory 602 temporarily, while the contents is kept in the contents memory 603 in the same way. In the next step, the central control 605 will make the necessary processing as writing into the hard disk the contents equivalent to the information (file name, packet number, data size etc.) stored in the header memory 602 or making the data shown on the display.

However, in the foregoing protocol processing in the prior art, the central control 605 makes the necessary processing including the generation of a header for communication to the terminal unit and giving instructions to couple data. As described above, demands from the terminal unit are not simple, so that the central control 605 often has to prepare many headers in response to various demands. And also, the amount of that processing or workload get to be increased, and its takes much time. This system processes not only send protocols but also receive protocols, which adds the further load on the central control 605.

Therefore, it takes a longer time, to send data equivalent to a request-to-send from the terminal unit 607 in response to the said request-to-send, and it delays sending data to the terminal units. Especially in each time of sending out running data such as moving images or pictures, data is fragmented into packet data in the same size and formed the same header. The protocol processing, that is, coupling the header with data and sending out the same is repeated, so that it results some defaults, that is, the overhead increases, the sending out from the server is delayed, and the reproduction of moving images on the terminal side is disrupted.

The present invention is proposed based on those shortcomings of the prior art.

SUMMARY OF THE INVENTION

The object of the present invention is to provide a server system and method for conforming to different protocols which may simplify the generation of header with a template in sending out running data such as moving images. Another object of the present invention is to provide a server system and method for conforming to different protocols which may reduce the load of the central control and send out running data such as moving images and pictures without delay.

In order to achieve the foregoing objects, the present invention comprises the means described hereinafter on the following server system which forms the basis thereof.

The server system refereed to the present invention is based on the one for sending out packet data, in which a header incorporated with the header constituting information 105, 405 in a specific form is coupled with a specific size of data read out from the memory storage 160, 460, along with generation of header constituting information 105, 405 according to a request-to-connect from the terminal side 111, 411.

In the present invention, the receiving part and the sending part of the server system is separated from the server system. The said invention is provided with a receive protocol processor 101 is provided for receiving processing and a send protocol processor 102 for sending-out processing. Therefore, it may be possible to send out a large size of data, such as moving image and audio data, which require to be continuous and consecutive.

Data covered by the present invention are sent out in the form of packet. As each packet header of the said packet is almost the same, a model for a packet header is to be prepared as template 121, 421.

To be more concrete, the said server system is provided with a header arithmetic means 110 which works out the header constituting information 105, 405 for the send protocol processor 102 and is also provided with templates 121, 421 as the model of the header of the packet data. Also header generating means 120, 420 is arranged to be inserted the header constituting information 105, 405 from the said header arithmetic means 110 into the template 121, 421. Meanwhile, with fragmentation means 130, 430, the data from the memory storage 160, 460 is fragmented into a specific size. And with a coupling means 140, 440, the header generated by the header generating means 120, 420 is coupled with a specific unit of data generated by the fragmentation means 130, 430.

AS the header style of the said template 121, 421 is changed by the type of communication system, in order to adapt the header to any type of communication system, the header generating means 120, 420 can be configured to be equipped with a plurality of templates 121, 421. Also, as the hierarchy for the required header constituting information 105, 405 is different according to the processing capacity of the terminal computer. The hierarchy matched to the terminal unit 111, 411 can be selected.

Furthermore, while the coupling means 140, 440 may be so constructed of timed gate that the headers and fragmented contents can be outputted one after another, it is possible to use a packet buffer which stores first the generated header and then the fragmented data.

DESCRIPTION OF THE PREFERRED EMBODIMENT

Now, the embodiments of the present invention will be described with reference to the drawings.

EMBODIMENT 1

Figure 1:
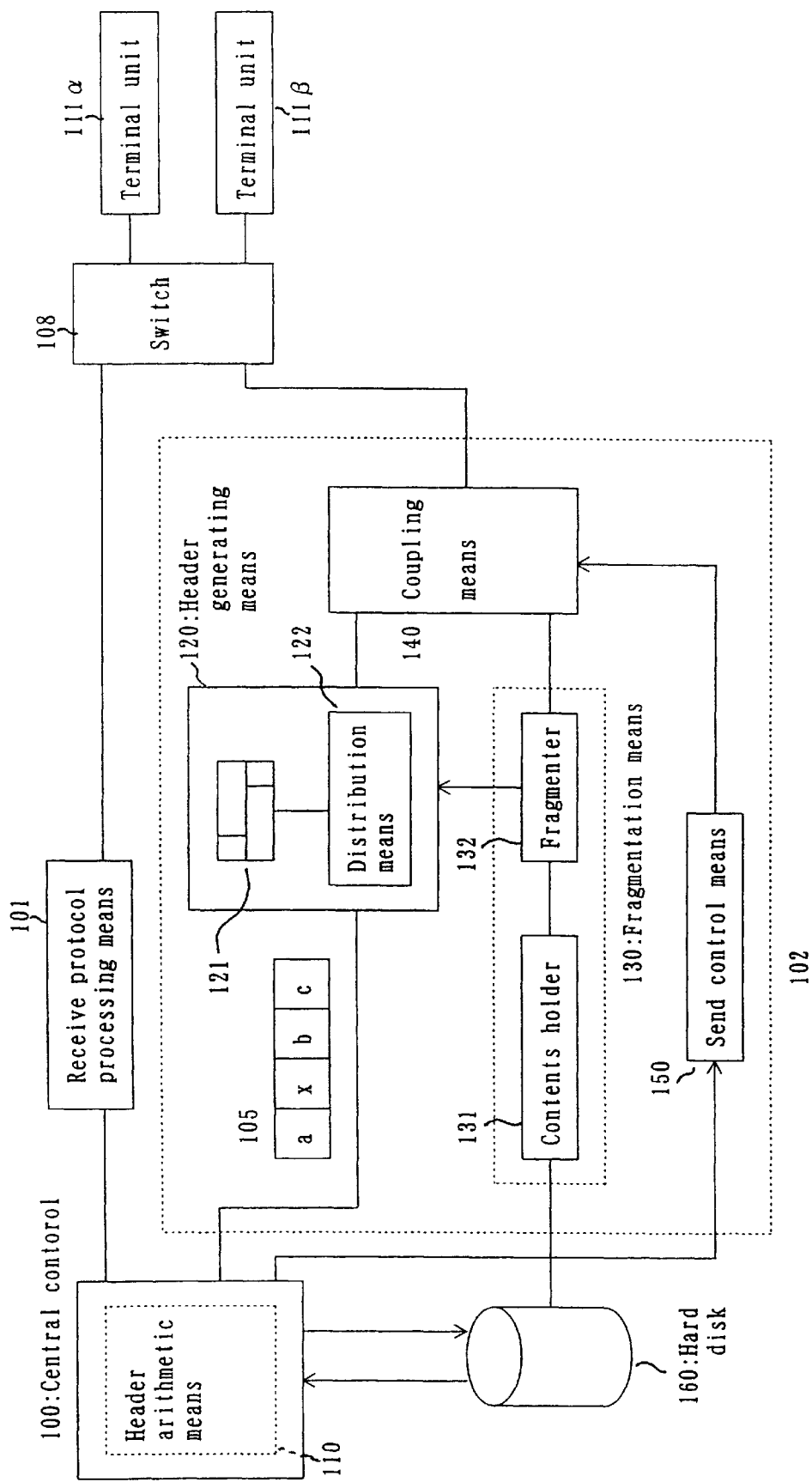
FIG. 1 is a block diagram of the server system in Embodiment 1 of the present invention.
Figure 7:
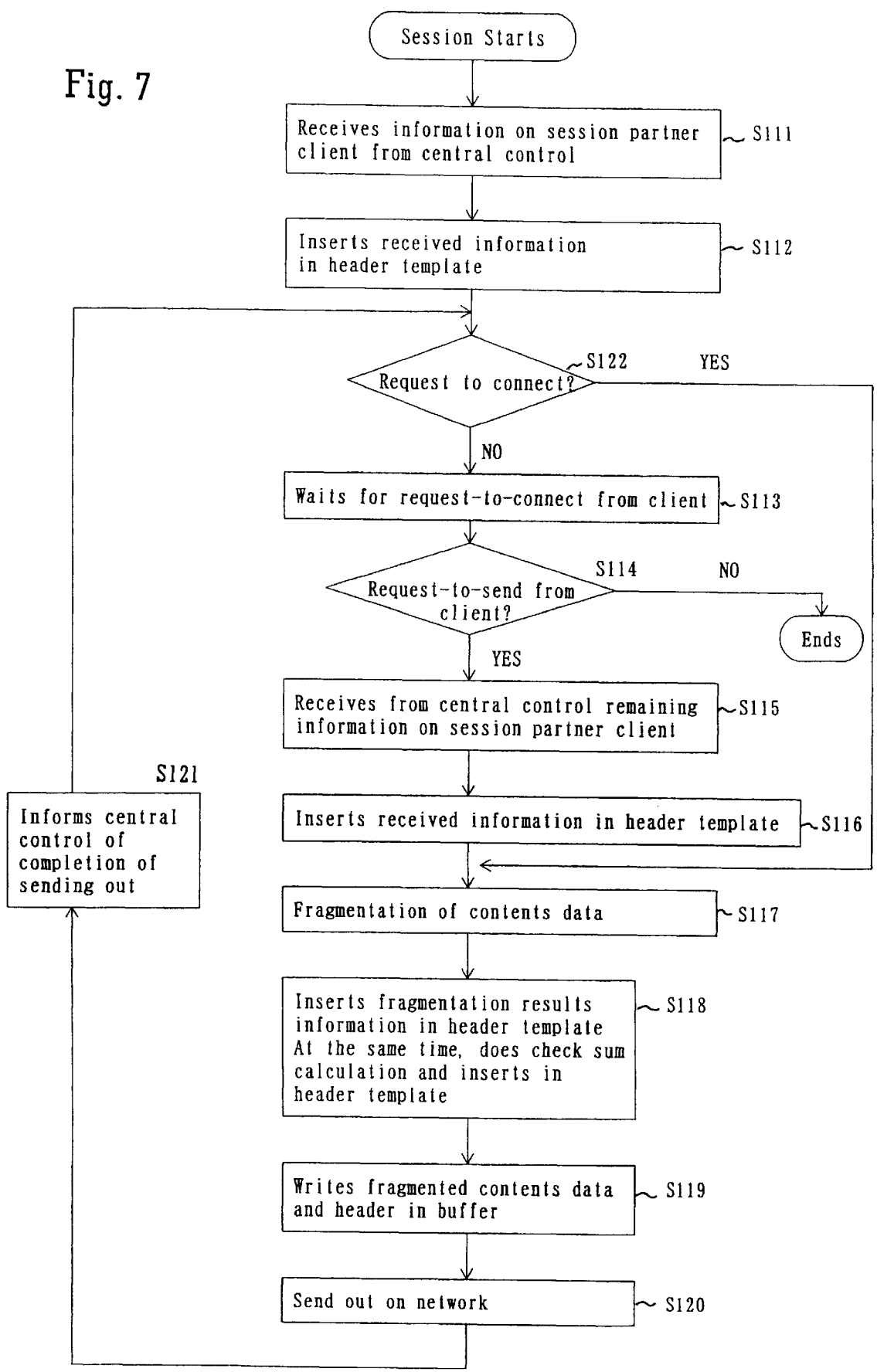
FIG. 7 is a flow chart showing the operating process in Embodiment 1 of the present invention.

FIG. 1 is a block diagram showing Embodiment 1 of the present invention, and FIG. 7 is its flow chart. With reference to FIG. 1 and FIG. 7, the arrangement and operation of the present embodiment are described hereinafter.

In this embodiment, the communication system adopts the NFS protocol. And also, as explained as follows, according to a request-to-connect from a terminal unit (indicated by the blank space longer than a specific time and the subsequent first request-to-send), the first header constituting information is generated and, next, at every time a request-to-send is received from the terminal unit, a header constituting information will be generated by altering with the changeable parts of the first header.

In the server system referred in the prevent invention, it is also noted, reception from the communication line is done at the receiving protocol processor 101 and the sending is undertaken by the send protocol processor 102. Also notable is that the communication line switch 108 can change channels between terminal units 111X (X: $\alpha, \beta \ldots$ ) and the server system.

In that arrangement, when a specific file is designated and the terminal unit 111 $\alpha$ sends a request-to-connect to the server system, the switch 108 forwards the request to the central control 100 by way of the receive protocol processor 101. The central control 100 is provided with an arithmetic means 110. From the data contained in the said request-to-connect that specifies the file, the said arithmetic means 110 generates header constituting information 105 necessary for generation of a header part of the packet data. Further, the said header constituting information 105 is to be incorporated into the usual packet data which includes the network address a of the terminal unit 111 $\alpha$, the address $\beta$ of the terminal unit itself and the size x of the contents data. The said header constituting information 105 thus generated is then forwarded to the send protocol processor 102.

As described above, the send protocol processor 102 receives the header constituting information 105 and then transfer it to the header generating means 120 (FIG. 7, Step S 111). The header generating means 120 is provided with a header template 121, in correspond to the style of the header. Each constituent element of the transferred header constituting information 105 are inserted in the header template 121 (FIG. 7, Step S 112).

There, when the header constituting information 105 is forwarded from the central control 100 to the header generating means 120, each constituent elements of the header constituting information 105, for example, are transferred in a specific order. Meanwhile, the header template 121 is constituted of memory means provided with a storage area for the constituent elements, by a distribution means 122 installed in the stage before the header template 121. The header template 121 is registered with each register in accordance with the aforesaid order.

The said distribution means 122 can be formed of either hardware or software. According to the software, its function can be entrusted to the central control 100.

The terminal unit secures a session by the request-to-connect (the blank longer than a specific time and the subsequent first request-to-send as described before). In this state, the process is to proceed to the fragmentation step one after another (FIG. 7, Steps S 122Y to S117).

That is to say, along with the above mentioned process, the central control 100 takes out a specific amount of contents to send from the memory means like a hard disk 160, and using DMA (Direct Memory Access) transfer function, stores the same into a contents data holder 131 in the fragmentation means 130 composed of the send protocol processor 102

The fragmentation means 130 is made up of the contents data holder 131 and a fragmenter 132. The data stored in the contents data holder 131 are fragmented at the fragmenter 132 one by one (in a packet size of, say, one kilobytes, with every 8 kilobytes of packet data formed into a unit or block). The header information which comes out of such a fragmentation (order of the packet data in the 8-kilobyte packet data block etc.) is sent from the fragmenter 132 to the header generating means 120 and inserted in the header template 121. Further, while the header generating means 120 calculates the check sum for the headers in which the header constituting information is inserted, the said check sum is inserted in the header template 121 (FIG. 7, Steps S 117 to S 118).

In the next step, the said header is stored at the top of the section of each packet data block in the packet buffer 140 which is a means for coupling the header and the contents data, and then, the fragmented contents data are stored after that of the said packet data block. The said fragmented contents data is formed in the size demanded by the terminal unit 111*a* (in one packet size per 8 kilobytes as described above) (FIG. 7, Step S 119).

When a request-to-connect is received from the terminal unit 111*a*, the send control means 150 constituted of the sending protocol processor 102 is also informed of that message. The send control means 150, which has got the message, then monitors the packet buffer 140. And when the specific volume of packet data is written in the packet buffer 140 as described above, the said send control means 150 sends out the packet data on the network. When the sending out operation is completed, the central control 100 will be notified of the completion of the operation. The central control 100 then is to waits for the next request-to-send from the terminal unit (FIG. 7, Steps S 120–S 121–S 122N–S 113).

In the subsequent process, every time the terminal unit receives the specific size of data, it issues the next request-to-send. And for each the said request-to-send, the current state (request) at the terminal side is sent to the central control 100. For each the said request-to-send from the terminal side as described above, the header arithmetic means 110 (central control) works out the current header constituting information 105 on the terminal unit. This present header constituting information 105 is a partially revised version of the header constituting information 105 obtained at the first request-to-connect. Here, the said revised parts are inserted in the above-mentioned template (FIG. 7, Step. S 114Y to S 115 to S 116).

In the aforementioned process of writing in the packet buffer 140, all of the packet data for 8 kilobytes(8 packets, for example) are written at the same time. If there is enough time to process, each packet is written one by one in the packet buffer 140, and a packet data of a specific number of packets has been formed in the packet buffer 140, thereafter the send out action may be taken.

It is noted in the above description to be limited to the transfer system using the NFS protocol, but it goes without saying that the present embodiment is applicable to data transmission systems of the same type in which a specific size of data (a specific number of packets) is sent out according to a request-to-send from the terminal unit.

EMBODIMENT 2

Since there are various protocols formulas applied in communication, the style of the header plate 121 has to be different according to types of protocols. The request-to-connect from the terminal contains signals to identify the type of protocol. The central control 100 in itself is capable to identifying the type of protocol. So, it can be made to select the type of the header template 121 on receipt of a request-to-connect from the terminal as shown in FIG. 2.

First, a number of header templates 121*y* (y: a, b, . . . ), each for a specific protocol applied for data communication types, are stored in the header generating means 120 in the send protocol processor 102. A template selection means 203 is provided in the stage before the group of header templates 121*y* in the header generating means 120.

The transmission formula of the terminal unit identified by the central control 100 is turned into a selection signal, which is then inputted into the template selection means 203. By the said signal, the template selection means 203 can select the said template which conforms to the transmission formula designated by the terminal unit. The template selection means 203 can be formed in a number of ways.

Figure 2:
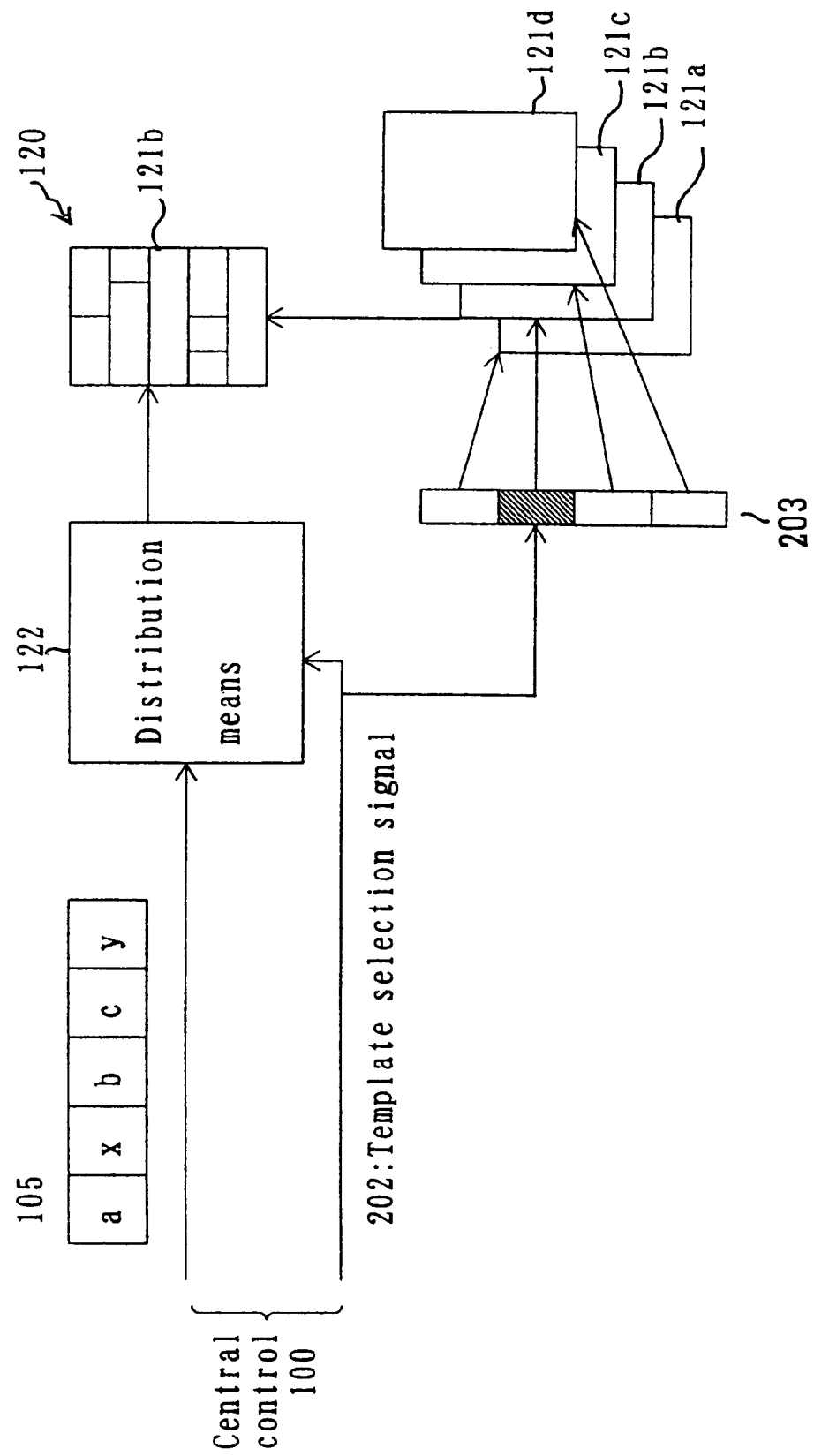
FIG. 2 is a block diagram of the header generating means in Embodiment 2 of the present invention.

FIG. 2 shows a template selection arrangement using a register in which the bit corresponding to the specified template 121*y* is actuated. Under this arrangement, the header constituting information 105 obtained from the central control 100 is allocated to a specific template 121*a* selected from among the group of templates 121*y*, whereby the header constituting information is generated in the process described in Embodiment 1.

EMBODIMENT 3

Communication regulation between the server system and the terminal units, are usually made by various dimensions called "a hierarchy", that is, the hierarchy called the physical layer to define the kind of communication line, called the network layer to define the communication partners, called the TCP/UDP layer to confirm whether communication is established or not, and called the application layer to regulate the file management or file transfer etc.

Information of each hierarchy is incorporated in the header and sent out to the terminal unit from the server system side. But some receive processing programs on the terminal side do not always require all of data as to hierarchy to be written in the template 121.

Even if, therefore, the same type of template 121 described in the above Embodiment 1 is selected, up to which layer in the hierarchy is to be inserted in the template 121—and whether data in the remaining layers is to be included in the contents data, or whether an upper layer, say, the application layer, is not to be used, for example—is different depending on the kind of the processing program on the terminal side.

The central control 100 recognizes those layers according to a signal to identify the layer, the signal contained in a request-to-connect from the terminal side. Following the recognition of the layers, a layer selection signal 302 is formed, which is explained hereinafter.

Figure 3:
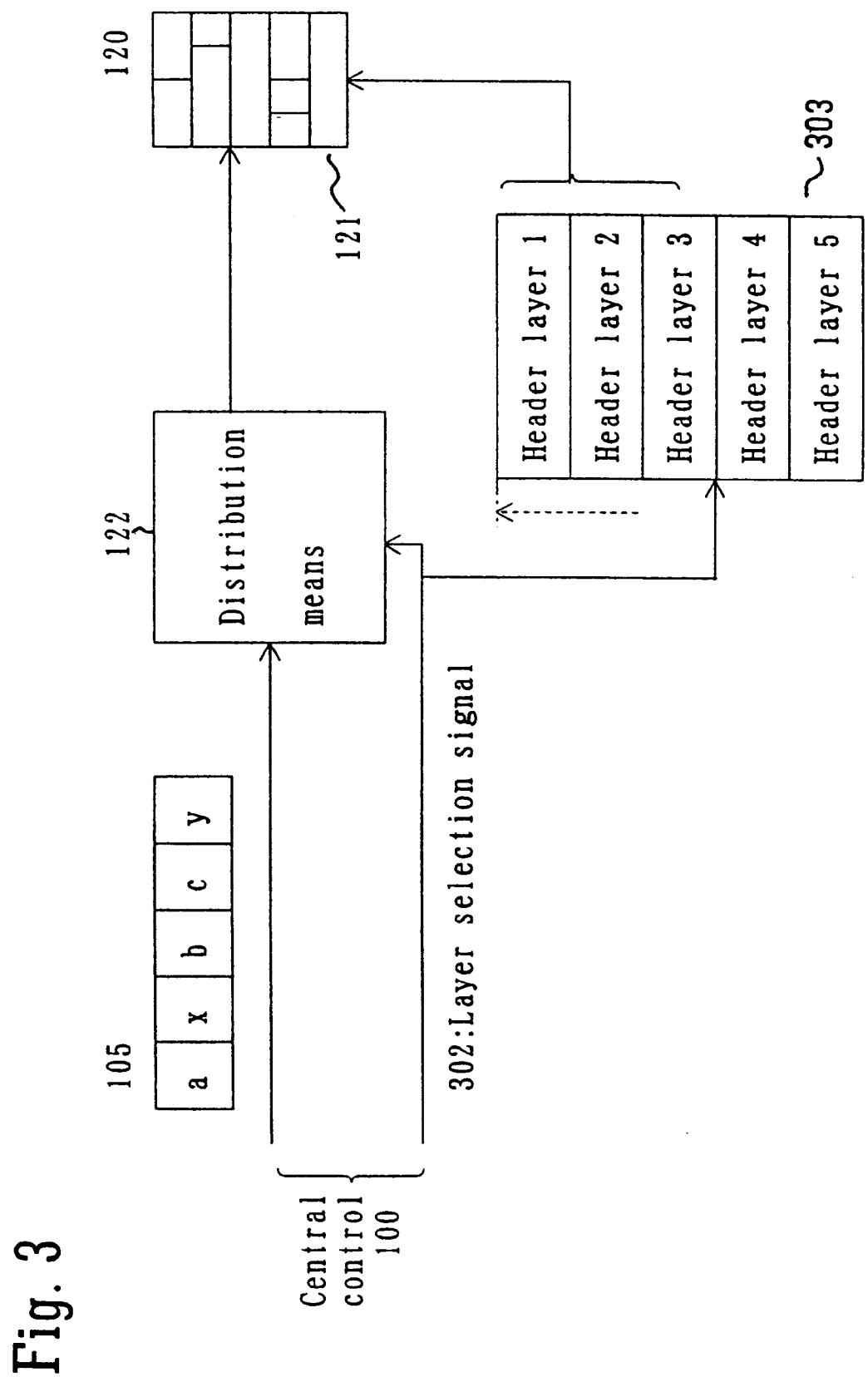
FIG. 3 is a block diagram of the header generating means in Embodiment 3 of the present invention.

The header generating means 120 is provided with a layer specifying means 303 as shown in FIG. 3. In the layer specifying means 303 is inputted the said layer selecting signal 302, whereby it is decided up to which layer in the packet data is to be written in the header template 121.

The header arithmetic means 110 in the central control 100 calculates the respective elements in the header constituting information 105 according to the information of the request-to-connect from the terminal side, and gives the calculation results to the header generating means 120 in the send protocol processor 102. At the same time the layer selecting signal 302 is given to the layer specifying means 303. Thereby the layers corresponding to the terminal unit are selected, and into the template 121 is written the header constituting information corresponding to the selected layers, for example, from the first layer to the third layer or from the first layer to the fourth layer.

In FIG. 3, layer 3 is picked out. That is, the header constituting information 105 from layer 1 to layer 3 will be inserted in the template 121, and the header will be generated in accordance with the procedure described in Embodiment 1. In FIG. 3, the layers down to layer 3 are specified, and the header information in the layers from layer 4 downward is handled as part of the contents data 106.

Figure 4:
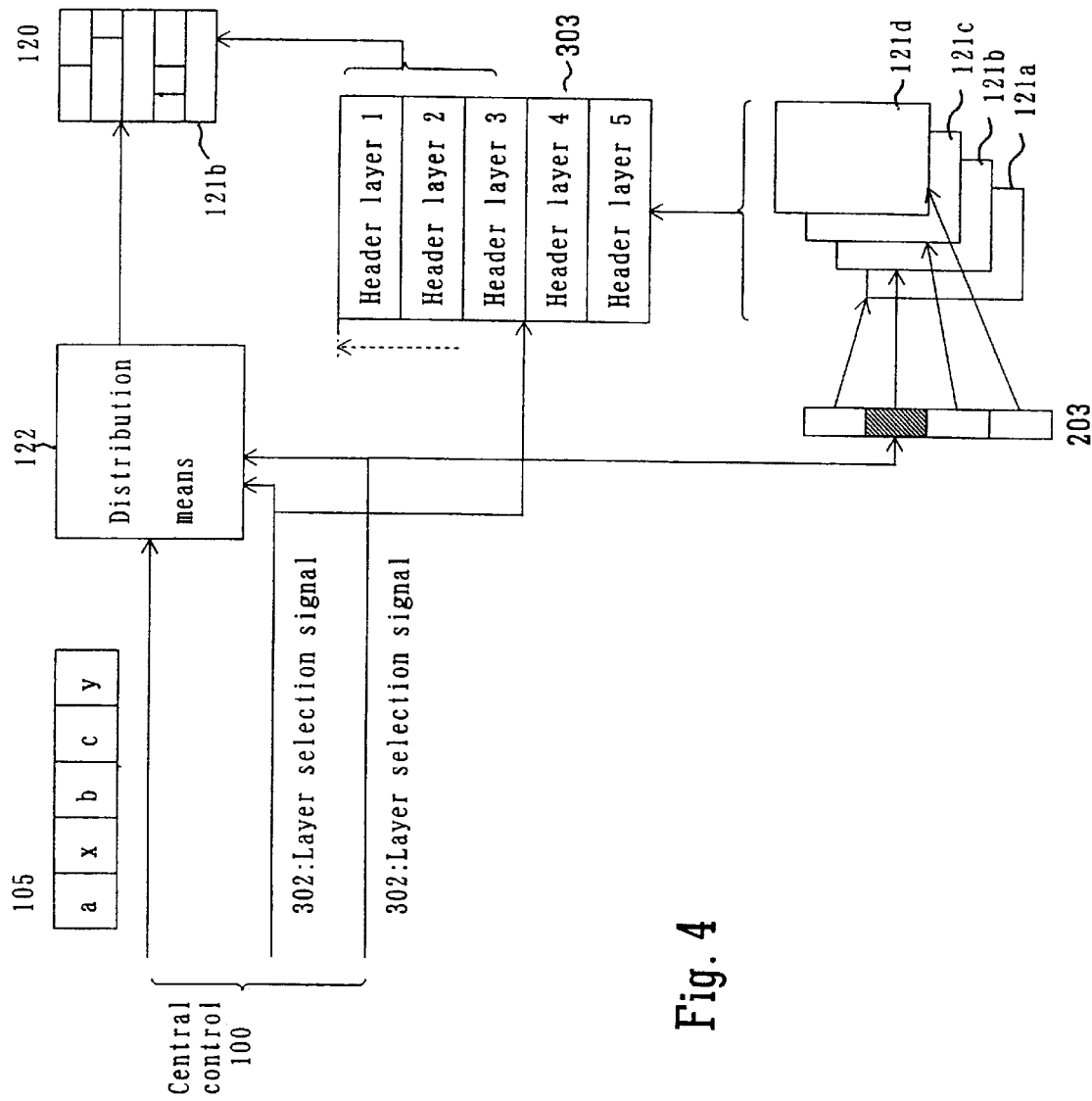
FIG. 4 is a block diagram of a variation example of the header generating means in Embodiment 3 of the present invention.

As illustrated in FIG. 4, it is possible to combine the template selection shown in FIG. 2 with the layer selection in FIG. 3. It is so arranged that every output of the template selection means 203 is inputted in the header generating means 120 by way of the layer specifying means 303. In this procedure, it is necessary for a combined signal of the template selection signal 202 and the layer selection signal 302 to be sent from the central control 100.

EMBODIMENT 4

Figure 5:
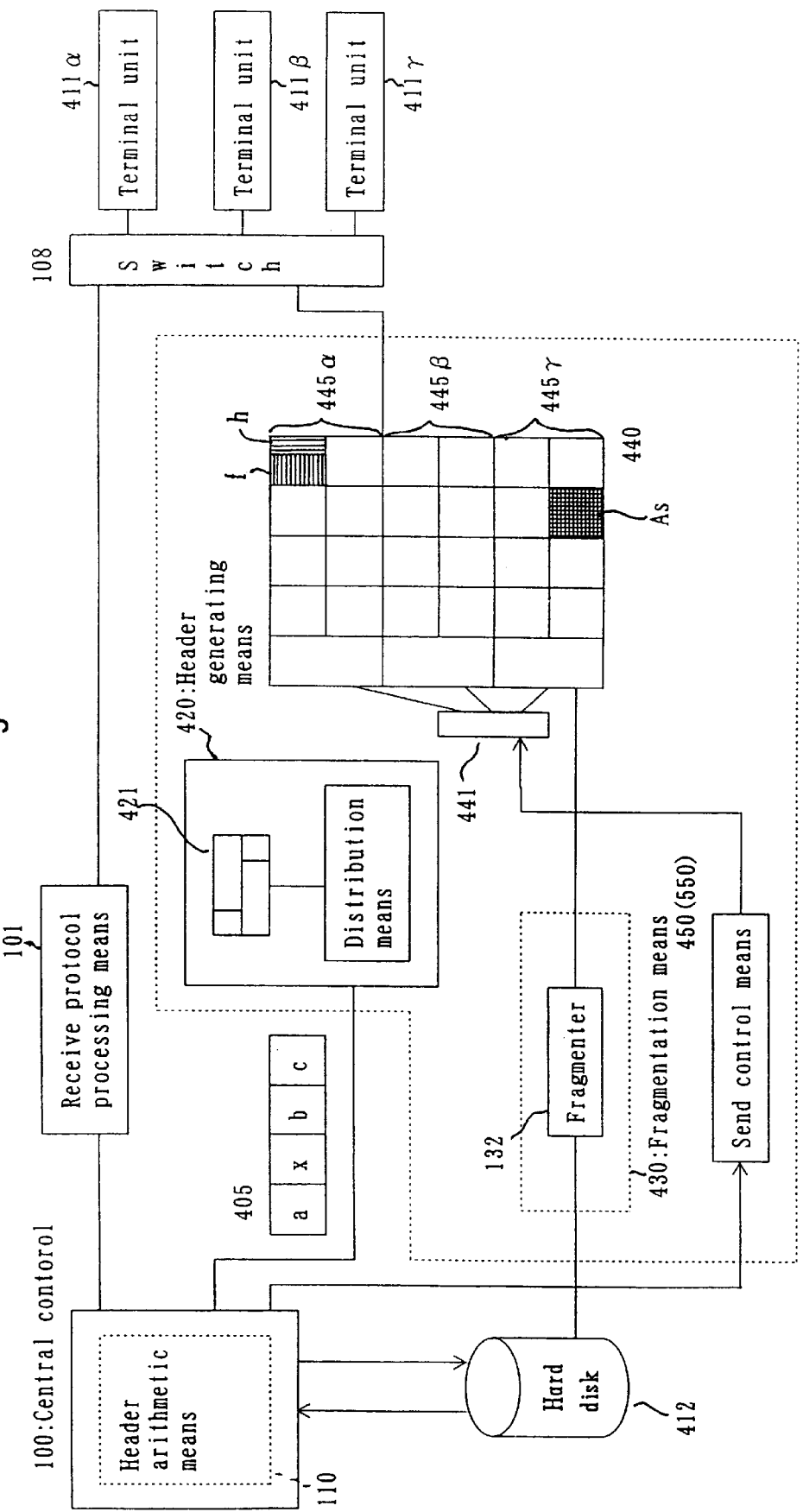
FIG. 5 is a block diagram of the server system in Embodiment 4 of the present invention.
Figure 8:
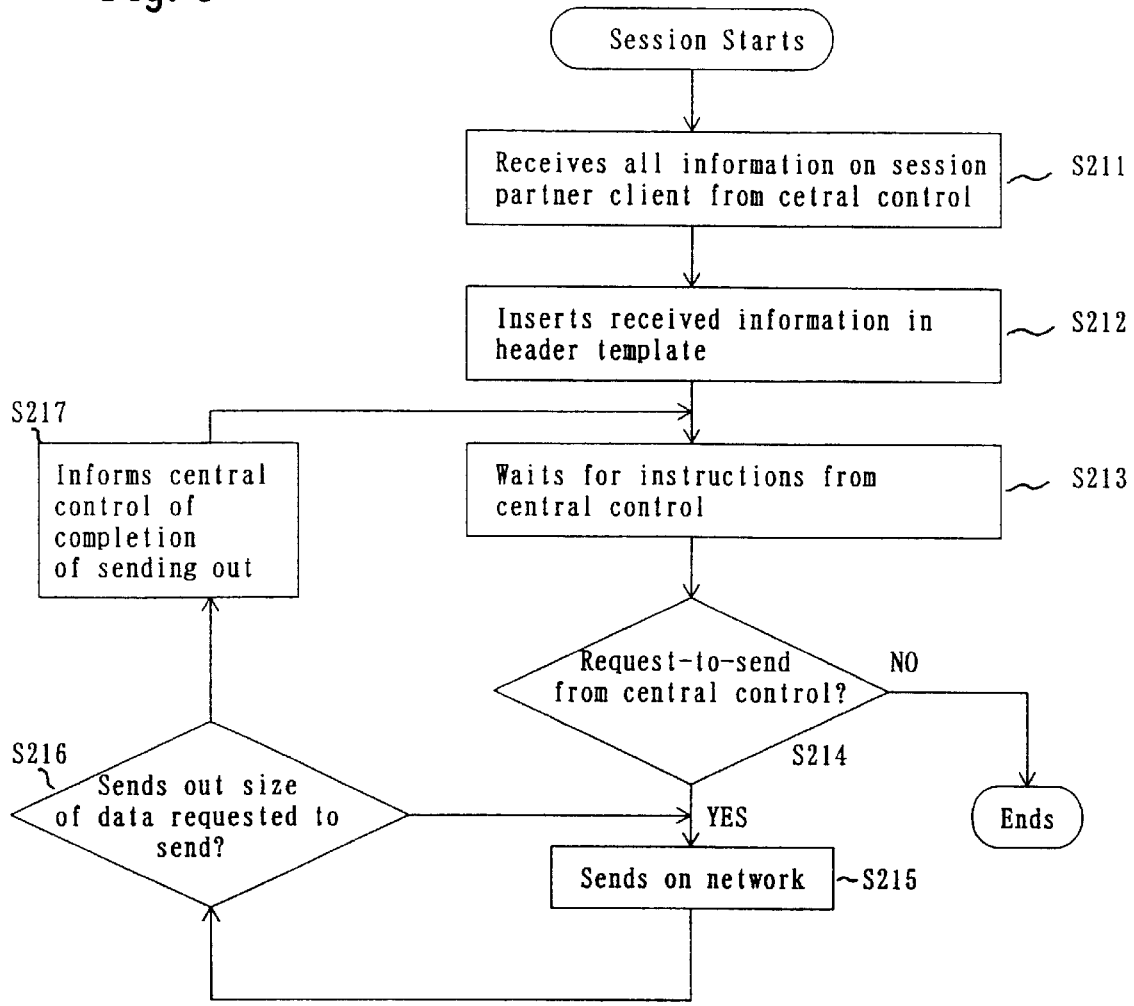
FIG. 8 is a flow chart showing the operating process in Embodiment 4 of the present invention.
Figure 9:
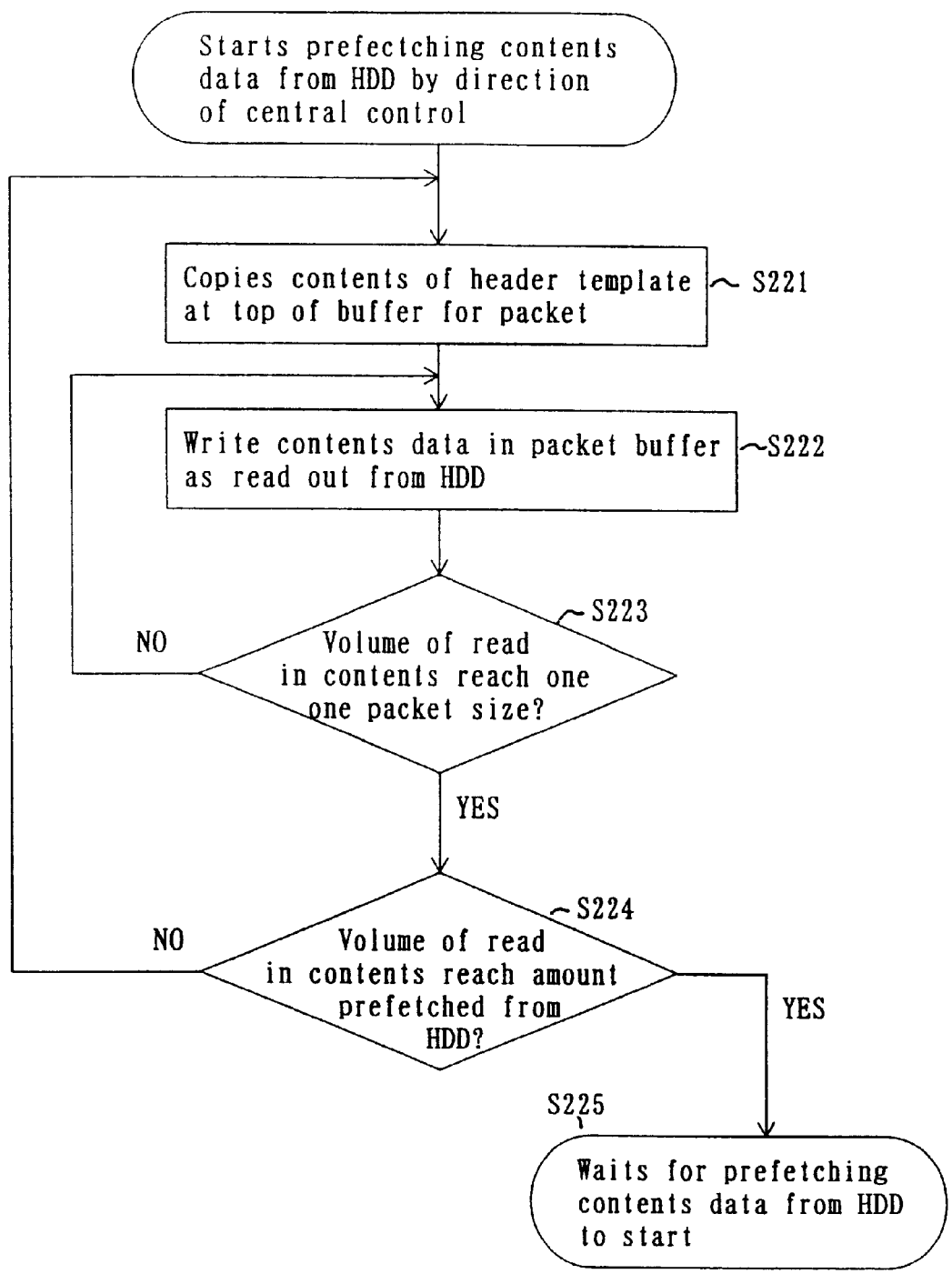
FIG. 9 is a flow chart showing the operating process in Embodiment 4 of the present invention.

FIG. 5 is a block diagram showing another embodiment, while FIG. 8 and FIG. 9 are flow charts illustrating the operating process thereof.

Now, there will be explained the configuration of the present embodiment and the operation thereof with reference to FIG. 5, FIG. 8 and FIG. 9. In Embodiment 1, it is noted that, header constituting information 105, which is generated by the header arithmetic means 110 in the central control 100 on receiving a request from the terminal side, is part of the header constituting information to be inserted in the template. In the present embodiment, it is to be understood that when a request-to-connect is received from the terminal side, all of header constituting information 405 will be generated by the header arithmetic means 410, as described hereinafter.

The server system is provided with a receive protocol processor 101 for receiving from communication line and a send protocol processor 102 for sending processing. The said basic configuration is the same as that of the embodiment shown in FIG. 1.

The communication line switch 108 can switch sending and receiving channels between the server system and a plurality of terminal units 411X (X: $\alpha, \beta \ldots$). And the server system is a multi-media server system for sending out long data with continuity and constancy, such as moving images or voices.

In that arrangement, when a request to send contents is sent to the server system from the terminal unit 411a, the said request is transferred by the switch 108 to the central control 100 via the receive protocol processor 101.

On receiving this request to send, the central control 100 notifies the send protocol processor 102 that the relevant information, that is, header constituting information and data proper, in order to generate a packet data to be sent out, dispatch to the terminal unit 411, and then the header constituting means 420 and fragmentation means 430 are activated in the send protocol processor 102.

In this stage, the header arithmetic means 410 in the central control 100 works out and refers header constituting information 405, and handle its result to the header generating means 420 in the send protocol processor 102, and then inserts the header constituting information 405 in a specific header template 421(FIG. 8, Steps S 211 to S 212).

And also in this stage, the send control means 450 in the send protocol processor 102 waits for a request-to-send from the central control 100 (FIG. 8, Step S 213).

In parallel with the aforesaid steps, the hard disk 460 request to prefetch a specific size of contents data such as 256 kilobytes to the fragmentation means 430 as described after. The said prefetched contents data and headers are written into each area equivalent to one packet size in the packet buffer 440 as coupling means (FIG. 9, Steps S 221 to S 222).

When the writing of the said contents data and the headers into the packet buffer 440 is completed, the central control 100 issues a request-to-send (send trigger) to the send control means 450 in the send protocol processor 402, and sent out the packet on the network (FIG. 8, Steps S 212 to S 214Y to S 215).

The request-to-send from the central control 100 are issued in blocks of a specific size, for example, 8 kilobytes. When the said requested size has been sent out, the send control means 450 informs the central control 100 of the end of sending out to that effect, and waits for a new request-to-send from the central control 100 (FIG. 8, Steps S 216Y to S 217 to S213).

Meanwhile, when the insertion of the header constituting information 405 in the header template 421 is completed, according to the instruction of central control 100, the contents of the said header template 421 will be copied in the section 445 $\Psi(\Phi: \alpha, \beta \ldots)$ that is secured on the buffer 440 (FIG. 9, Step S 221). While the respective sections 445 $\Psi$ on said packet buffer 440 corresponds to the respective terminal units 411X, the terminal unit 411 $\alpha$ which sent out the request-to-send corresponds to the section 445 $\alpha$. The central control 100 previously recognizes the relationship between the said terminal unit 411X and the section 445 $\Psi$.

The section 445 $\alpha$ is further divided into sub-sections As in a size equivalent to one packet. At the top of the respective sub-sections, the contents of the header template 421 are copied.

When the copying is over, the fragmentation means 430 will read out the contents from a hard disk 460, and fragments the data in a size equivalent to one packet, and the fragmented data f will then be written after the header h, written in as described above, in each sub-section As. (FIG. 9, Steps S 222 to S 223).

When the data in size equivalent to one packet has been written in the first sub-section As, the contents of the header template 21 is copied at the top of the next sub-section As, and then the next fragmented data is written after the header (FIG. 9, Steps S 224 to S 221). After this procedure is repeated, and the amount of data written in the packet buffer 440 reaches the said specific prefetched level, that is, 256 kilobytes, the writing in the buffer 440 is temporarily suspended and the next prefetch direction will be awaited (FIG. 9, Step S 225).

As shown in Step 215, the sending from the packet buffer 440 to the terminal unit 411 $\alpha$ is effected at the same time during the above process. The said sending process increases the available capacity in the packet buffer 440, which is constantly monitored by the send control means 450. When the available capacity gets to be over the specific level, the next prefetch direction is issued (FIG. 9, Step S 225).

In the process of consecutive and constant data such as moving image and audio data, the headers generated at the said header template 421 in the said send protocol processor 102 can be regarded as almost same each other except for packet numbers. Therefore, when a header is given to each one-packet-size data, only each packet number of the said header is to be modified one by one as by raising the packet number and further taking some of well-known procedures, such as, calculation of partial check sum. The above mentioned process can be used repeatedly in a number of send protocol processing at one times of generation for header.

As mentioned, at the proper time to send packet data via the send-only port, the central control 100 gives a request-to-send to the send control means 450. If the size of one contents data is one kilobytes and the requests-to-send is issued every 100 milliseconds, the contents data can be sent to the terminal unit 411 $\alpha$ at a rate of one megabytes/second.

If further data are prefetched and put in place in another packet buffer before the aforesaid 256 kilobytes of contents data stored in the packet buffer are sent out, therefore, the contents data can be transferred to the terminal unit 411 at a rate of 1 megabytes/second without interruption.

The send protocol processor 102, as described above, can wait on a number of terminal units 411X (X: α, β . . . ). That is, the packet buffer 440, as mentioned above, is provided with sections 445 Ψ (Ψ: α, β . . . ) for the respective terminal units, while the central control 100 recognizes beforehand the relationship between the respective terminal units and the respective sections 445 Ψ. The central control 100 is also provided with a function of recognizing or identifying, after receiving a request to connect from the terminal unit 411X, which the terminal unit 411X has sent out the request-to-connect.

Figure 6:
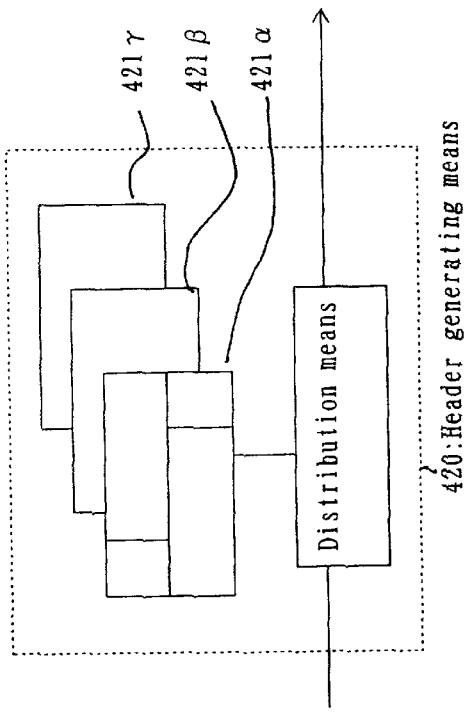
FIG. 6 is a block diagram of the template generating means in another embodiment of the present invention.
Figure 12:
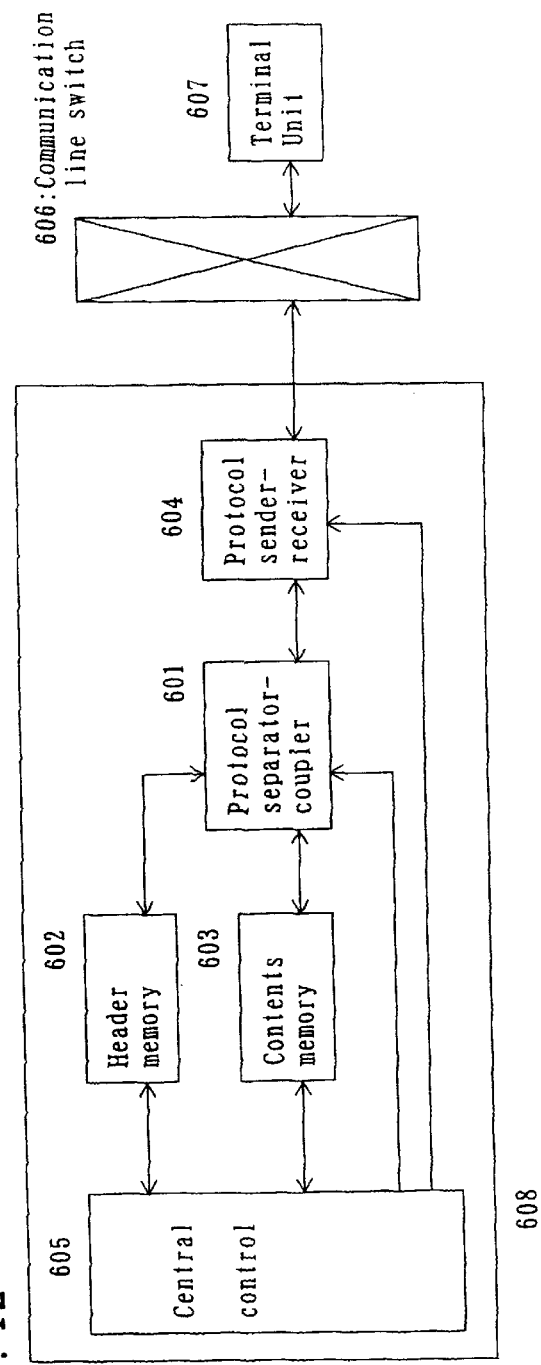
FIG. 12 is a conceptional diagram of the prior art server system.

In the above process, the section 445 Ψ where the contents of the header template 421 are to be copied is notified beforehand to the header generating means 420 along with the said header constituting information 405. Then, as shown in FIG. 6, the header generating means 420 generates a header template 421 Φ (Φ: α, β . . . ) which corresponds to the notified section 445 Ψ, and the contents is copied on the sub-section As corresponding to the section 445 Ψ. Also, the section 445 Ψ where the fragmented data is to be copied is notified in advance to the fragmentation means 430 together with the data to be handed over from the hard disk 460, and the said fragmentation means 430 writes the fragmented data into the notified section 445 Ψ.

Furthermore, when an identifier to identify the terminal 411X is complied in the request-to-send, section selecting means 441 provided in the stage before the packet buffer 440 selects a section 445 Ψ to be used and sends out the packet data on the said section 445 Ψ.

EMBODIMENT 5

As for the data transmission modes, there is a mode that the data are transferred in a specific size, such as in 8 kilobytes, whenever a request-to-send is received from the terminal side as described in Embodiment 1, another is that the data are send out in blocks of a specific size in accordance with a send instruction from the central control 100 at specific intervals as in Embodiment 4, and still another is that, on receipt of reqest-to-connect from the terminal unit, data read out from a hard disk or the like are allowed to effluent endlessly to the said terminal unite.

Figure 10:
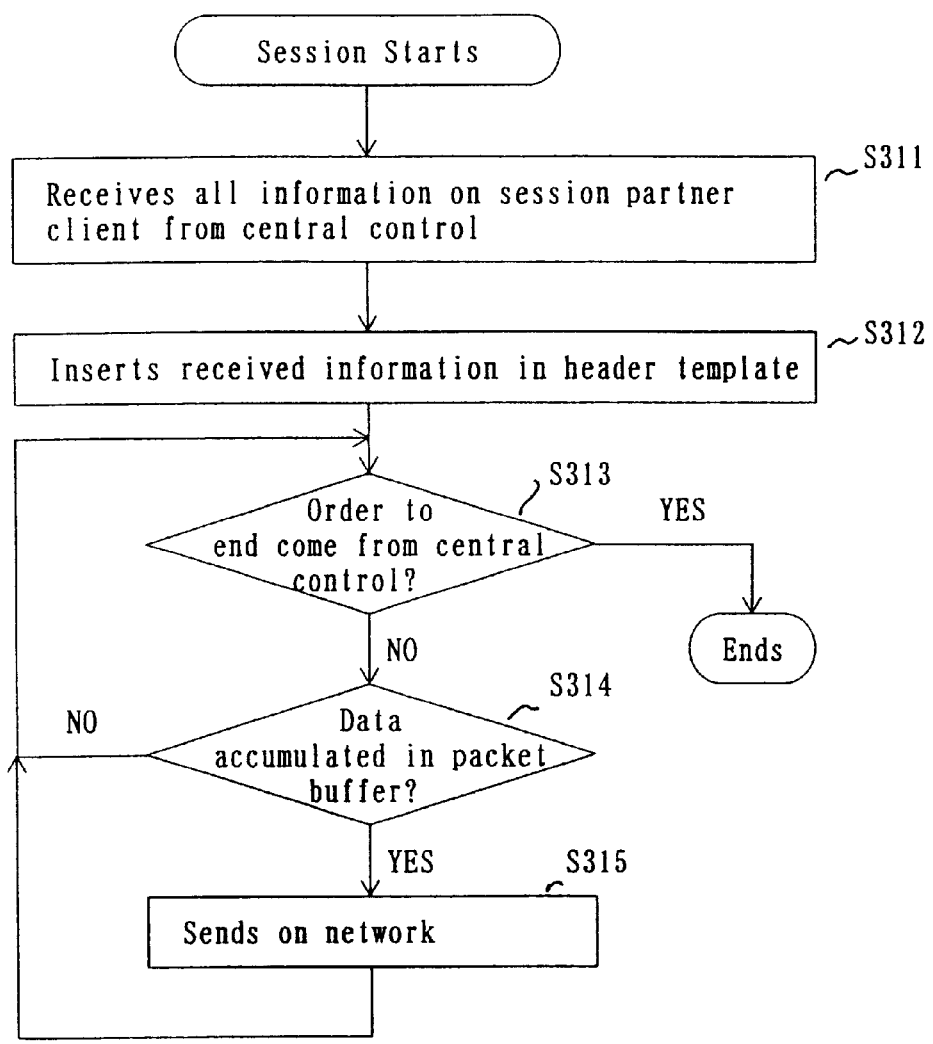
FIG. 10 is a flow chart showing the operating process in Embodiment 5 of the present invention.
Figure 11:
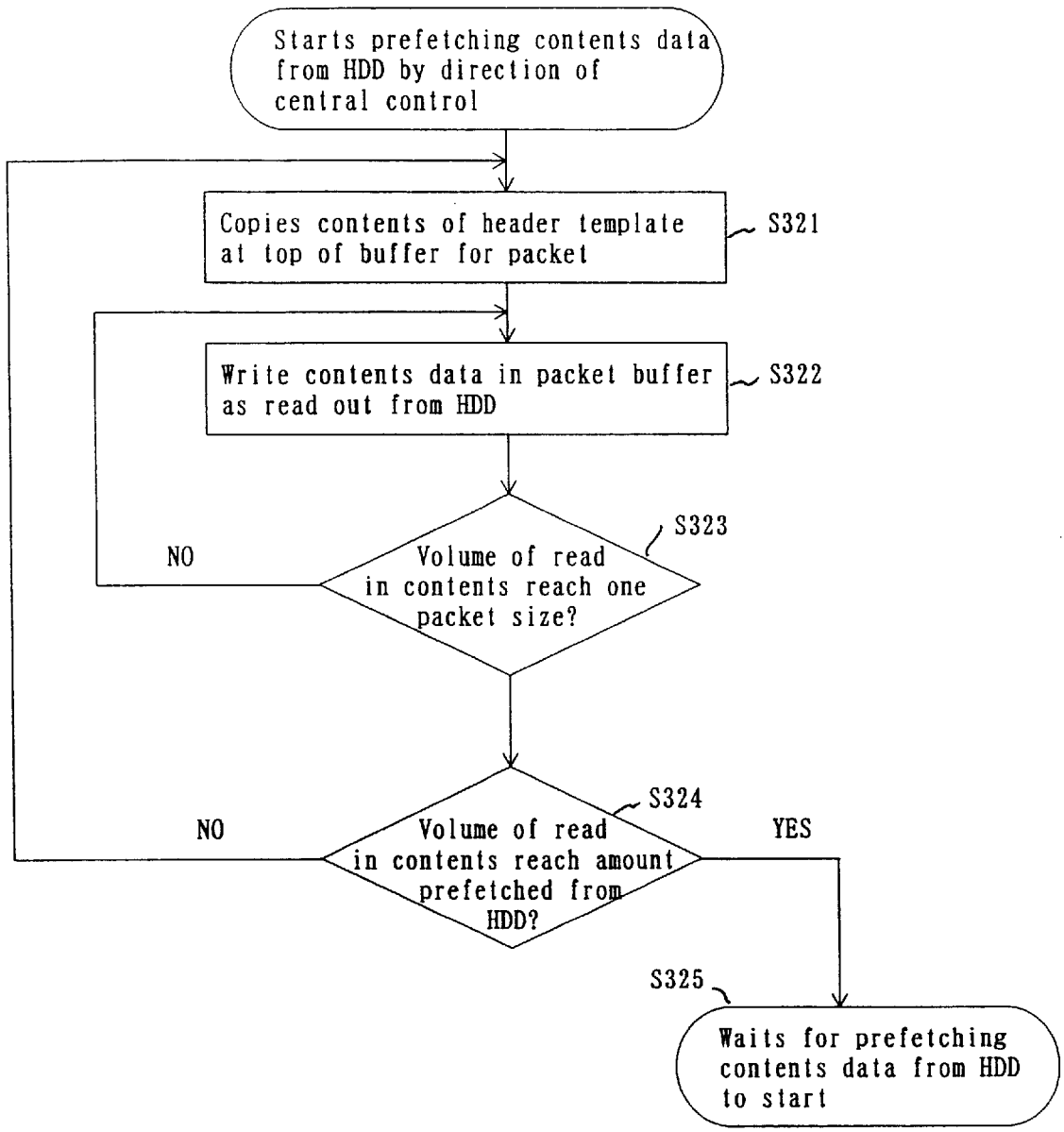
FIG. 11 is a flow chart showing the operating process in Embodiment 5 of the present invention.

FIG. 10 and FIG. 11 show the process of sending out data on the server system side in the said endless effluent mode. The arrangement of the server system itself is same as that shown in FIG. 5. Referring to FIG. 5, FIG. 10 and FIG. 11, the configuration and operation of the present embodiment will be explained hereinafter. In this embodiment, too, it is so arranged that all of header constituting information 405 is generated by the header arithmetic means 410 in the central control 100 when a request-to-connect is received from a terminal unit X.

The basic configuration of the present example is that the server system is provided with a receive protocol processor 101 only for receiving from the communication line and with a send protocol processor 102 for sending processing which is same as that shown in FIG. 1.

The communication line switch 108 can change sending and receiving channels between the server system and a plurality of terminal units 411X. The server system is to be a multi-media server system for sending out data, long and large, continuous and consecutive and constancy, as moving images and audio data. And a terminal unit 411c should be one which requests to the server system for sending data in a endless effluent mode.

The central control 100 receives a request-to-connect from the terminal unit 411c and gives to the send protocol processor 102 the notice that that the center control 100 forwards to the terminal unit 411c the information data, which are the header constituting information and data to generate a packet data which sent to the terminal unit 411c. Accordingly, the header generating means 420 and the fragmentation means 430 in the send protocol processor 102 will be activated.

After that, the central control 100 hands over to the send protocol processor 102 all the header constituting information 405 in the packet data. The header generating means 420 in the send protocol processor 102 in turn inserts the received header constituting information 405 in the header template 421 (FIG. 10, Steps S 311 to S 312). In this state, the send control means 550 in the send protocol processor 102 judges whether the data is stored in the packet buffer 440 (FIG. 10, Step S 314), if the data is stored, sends out the said data on the network.

On the other hand, if not, the data onto the network keeps waiting to be stored, as long as the order to stop sending does not come from the central control 100 (FIG. 10, Steps S 314N to S313N to be repeated). In other words, as long as a specific volume of data is accumulated in the packet buffer 440, data is sent out automatically on the network without instructions from the central control 100.

Here it is to be understood that a specific section 445 γ in the packet buffer 440 is allotted for the terminal unit 411c.

As in the action upon the request-to-send from the central control 100 (trigger mode) as described in Embodiment 4, the header generated by the header generating means 420 in Step S 312 is written at the top of the first one packet size sub-section As in the packet buffer 440 along with the aforesaid action (FIG. 11, Step S 321). Furthermore, the contents data is read out from the hard disk 460 and fragmented in a size of one packet. The fragmented contents data f are then written after the header h in the first sub-section As described in Embodiment 4 (FIG. 11, Steps S 322 to S 323 repeated).

That process will be repeated until the volume of data read out of the hard disk 460 reaches a specific level, such as 256 kilobytes (FIG. 11, Steps S 324N to S 321 repeated). When the volume of read out data has come to the specific level, the next direction to read out is waited from the central control 100 (FIG. 11, Step S 325).

In the present embodiment, it is also possible to process requests-to-send from more than one terminal unit 411 X at the same time.

That is, the central control 100 recognizes previously the relationship between the terminal units 411 X's and the respective sections 445 Ψ at the time of formation of packet data, and along with the aforementioned header constituting information 405, the section 445 Ψ where the contents of the header template are copied is given to the header generating means 420 by the central control 100, so that the header generating means 420 generates a template 421 Φ corresponding to the terminal unit 411X as shown in FIG. 6 and at the same time copies the contents of the template 421P in the corresponding section. Also, the section 445 Ψ where the fragmented data are to be copied is notified to the fragmentation means 430 together with the data to be delivered from the hard disk 460. The said fragmentation means 430 writes the fragmented data into the notified section.

Before reading out a packet data, the send control means 550 finds out the section to be read out with an identifier in the instruction signal complies in the read out instruction which was issued from the central control 100.

OTHER EMBODIMENTS

In the said Embodiment 1, both the templates 121 generated by the template generating means 120 and the packet buffer 140 as coupling means is to correspond to more than one terminal unit 111 X as same as in the Embodiment 4 and the Embodiment 5.

The mode of sending out data to the terminal side is decided according to the process application of the terminal unit and the capability of the server system. It can be happen that a plurality of terminal units demand the different sending out modes of one server system. In this case, there are provided header generating means 120, 420, fragmentation means 130, 430 and send control means 150, 450, 550 in order to be applied each relevant modes. Also, the packet buffers 140, 440 are provided with sections equivalent to the said plurality of terminal units.

In the foregoing each embodiment, the buffer is provided as coupling means 140, 440. It is also possible to use a gate circuit to adjust the output timing of both the header generating means 120, 420 and the fragmentation means 130, 430.

According to the present invention, as described above, at the time of sending out packet data on the communication line, the processing in the system can be speeded up by reducing the processing load for generating the said packet data. On sending out data as moving images and audio data required to be continuous and also to be real time, the rate of the said sending out data can be easily control with high precision.

What is claimed is:

1. A method of conforming to different protocols in a server system which generates header constituting information on a request-to-connect from a terminal unit and sends out a packet data with a header having said header constituting information incorporated in a specific form coupled with a specific size of data read out of a memory storage, said system provided with a receive protocol processor to process the receive from the communication line and a send protocol processor to process the send to the communication line, comprising the steps of:

forming a header by inserting, in a template, header constituting information obtained on the basis of said request-to-connect from said terminal unit, said template provided in said send protocol processor as header model of said packet data, and coupling said header formed in the foregoing step with said specific size of data to form said packet data.

2. The method of conforming to different protocols in a server system as defined in claim 1, wherein said template is provided in such a number as matched for a plurality of header styles conforming to different data transmission formulas so that the template adapted for the data transmission formula adopted by the terminal unit can be selected.

3. The method of conforming to different protocols in a server system as defined in claim 1, wherein in forming a header with a hierarchical structure, the number of layers can be selected which are to be written in said template.

4. A server system which generates header constituting information on a request-to-connect from a terminal unit and sends out a packet data with a header having said header constituting information incorporated in a specific form coupled with a specific size of data read out of a memory storage, said system provided with a receive protocol processor to process the receive from the communication line and a send protocol processor to process the send to the communication line, characterized in that said send protocol processor is provided with header arithmetic means for working out said header constituting information, header generating means, having templates as models of the headers of packet data, for inserting in said templates the header constituting information obtained by said header arithmetic means, fragmentation means for fragmenting in a specific size said data obtained from said memory storage and coupling means for coupling the header generated by said header generating means with a specific size of data generated by said fragmentation means.

5. The server system as defined in claim 4, wherein said header arithmetic means outputs all header constituting information required at the moment when a request-to-connect is received from a terminal unit.

6. The server system as defined in claim 4, wherein a transmission formula is used in which the terminal unit sends out requests, one after another, to send data in a specific size after a request-to-connect, and said header arithmetic means outputs only part of the whole header constituting information required at the moment when the request-to-connect is received from the terminal unit, with the remaining header constituting information to be worked out each time a request-to-send is received.

7. The server system as defined in claim 4, wherein said header generating means is provided with templates for a plurality of header types adapted for data transmission formulas and, in addition, with template selection means which permits selection of the template matched with the data transmission formula adopted by the terminal unit.

8. The server system as defined in claim 4, which is provided with hierarchical layer selection means which permits said header generating means to select the number of layers to write in when generating a header having a hierarchical structure.

9. The server system as defined in claim 4, wherein said coupling means is a packet buffer which, for each packet data, couples said generated header with the fragmented data in such a way that the former comes at the top and the latter is stored after that.

10. The server system as defined in claim 5, which is provided with a packet buffer as said coupling means which, for each packet data, couples said generated header with the fragmented data in such a way that the former is at the top and the latter is stored after that and, said send control means for sending out, by a specific number, the packet data stored in said packet buffer.

11. The server system as defined in claim 5, which is provided with a packet buffer as said coupling means which, for each packet data, couples said generated header with the fragmented data in such a way that the former is at the top and the latter is stored after that and, said send control means for sending out, one after another, packet data stored in said packet buffer.

12. The server system as defined in claim 6, which is provided with a packet buffer as said coupling means which, for each packet data, couples said generated header with the fragmented data in such a way that the former comes at the top and the latter is stored after that and, said send control means for sending out, by the specific number, the packet data stored in said packet buffer each time a request-to-send is received from the terminal side.

13. The server system as defined in any of claim 9, wherein said packet buffer is provided with sections for the respective terminal units and with a function of selecting the right section on the basis of the request-to-send from the terminal unit.

14. The server system as defined in claim 13, where said header generating means generates headers matched to the respective terminal units.

15. The server system as defined in claim 13, wherein said respective terminal units are ones which are of different communication formulas.

16. A storage medium with a protocol-conforming procedure recorded therein as program in a server system which generates header constituting information on a request-to-connect from a terminal unit and sends out a packet data with a header having said header constituting information incorporated in a specific form coupled with a specific size of data read out of a memory storage, said system provided with a receive protocol processor to process the receive from the communication line and a send protocol processor to process the send to the communication line, wherein in said storage medium are recorded a header forming procedure of forming a header by inserting in a template the header constituting information obtained on the basis of a request-to-connect from the terminal unit, said template provided in the send protocol processor as header model of a packet data, and coupling procedure of generating a packet data by coupling the header formed in said step with said specific size of data.

* * * * *